United States Patent [19]

Berghof

[11] 4,035,602
[45] July 12, 1977

[54] APPARATUS FOR UNDERWATER ARC WELDING

[76] Inventor: Ernest H. Berghof, 5408 Sailfish St., Orlando, Fla. 32809

[21] Appl. No.: 514,114

[22] Filed: Oct. 11, 1974

Related U.S. Application Data

[60] Continuation of Ser. No. 175,220, Aug. 26, 1971, which is a division of Ser. No. 886,245, Nov. 13, 1969, Pat. No. 3,632,950, which is a continuation-in-part of Ser. No. 701,700, Jan. 30, 1968, abandoned.

[51] Int. Cl.$^2$ ............... B23K 9/16; B23K 9/32; B63C 11/00
[52] U.S. Cl. .................. 219/72; 61/69 R; 219/74; 219/137 R
[58] Field of Search ............ 219/72, 73, 74, 75, 219/121 EB, 121 EM, 60 R, 60 A, 130, 131, 137; 61/69 R, 69 A, 70, 72.1, 82

[56] References Cited

U.S. PATENT DOCUMENTS

| | | | |
|---|---|---|---|
| 1,552,369 | 9/1975 | White | 219/74 |
| 1,711,151 | 4/1929 | Lincoln | 219/74 |
| 1,746,207 | 2/1930 | Alexander | 219/74 |
| 2,053,417 | 9/1936 | Brace | 219/72 |
| 2,459,812 | 1/1949 | Griffiths | 219/74 |
| 3,239,647 | 3/1966 | Irniger | 219/130 |
| 3,371,185 | 2/1968 | Anderson | 219/121 EB |
| 3,386,254 | 6/1968 | Connally | 219/72 UX |
| 3,462,961 | 8/1969 | Berard | 219/72 UX |

FOREIGN PATENT DOCUMENTS 446,035  8/1946  Italy ................ 219/74

Primary Examiner—A. Bartis
Attorney, Agent, or Firm—C. W. Mortenson

[57] ABSTRACT

A housing chamber for use in underwater arc welding is constructed in the form of a portable hollow cylinder open at one end and having a side opening in which is movably mounted a welding gun for effecting a welding operation on a workpiece through the open end. The interior of the housing chamber is illuminated and a viewing plate slanted relative to the axis of the cylinder closes the other end. The chamber is provided with means for introducing gas under pressure to purge the chamber of water. An L-shaped vent tube adjacent the viewing facilitates purging the housing chamber of water. The vent tube is rotatably adjustable relative to the housing chamber to control the amount of gas discharged. A porous rubber gasket member is provided between the workpiece and the open end of the cylinder to permit escape of gas therethrough to facilitate relative movement between the cylinder and the workpiece.

33 Claims, 12 Drawing Figures

INVENTOR
Ernest H. Berghof
BY
Mortenson + Weigel
ATTORNEYS

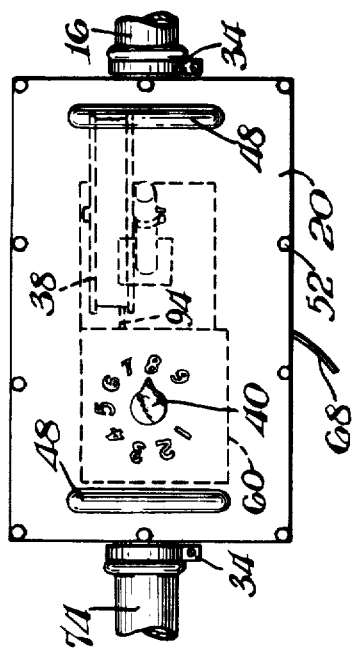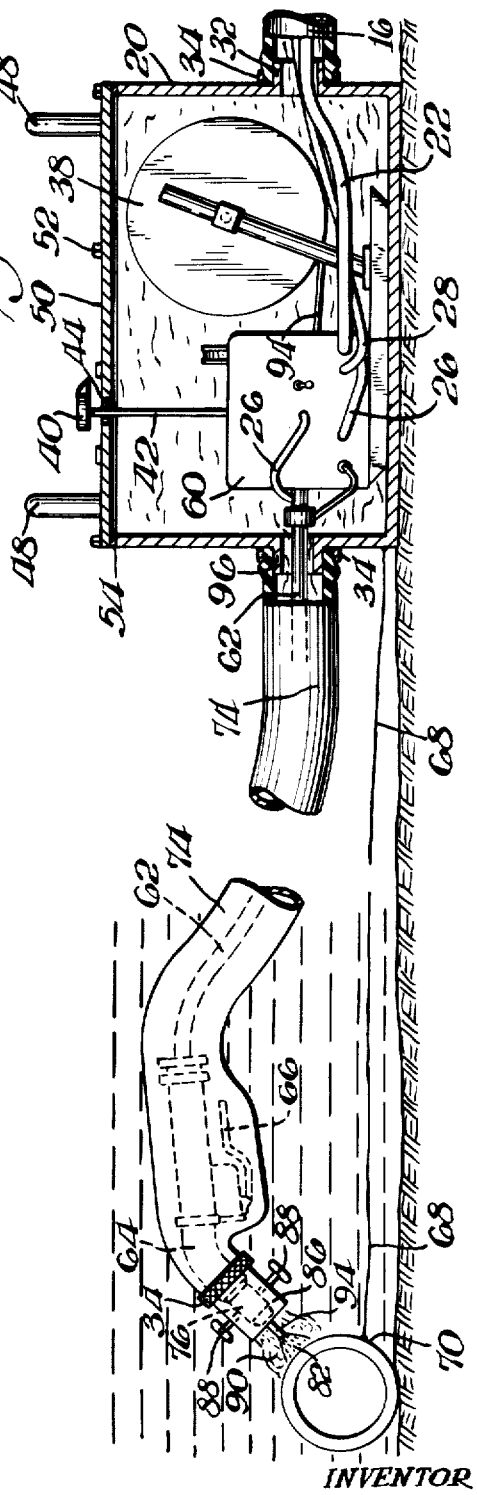

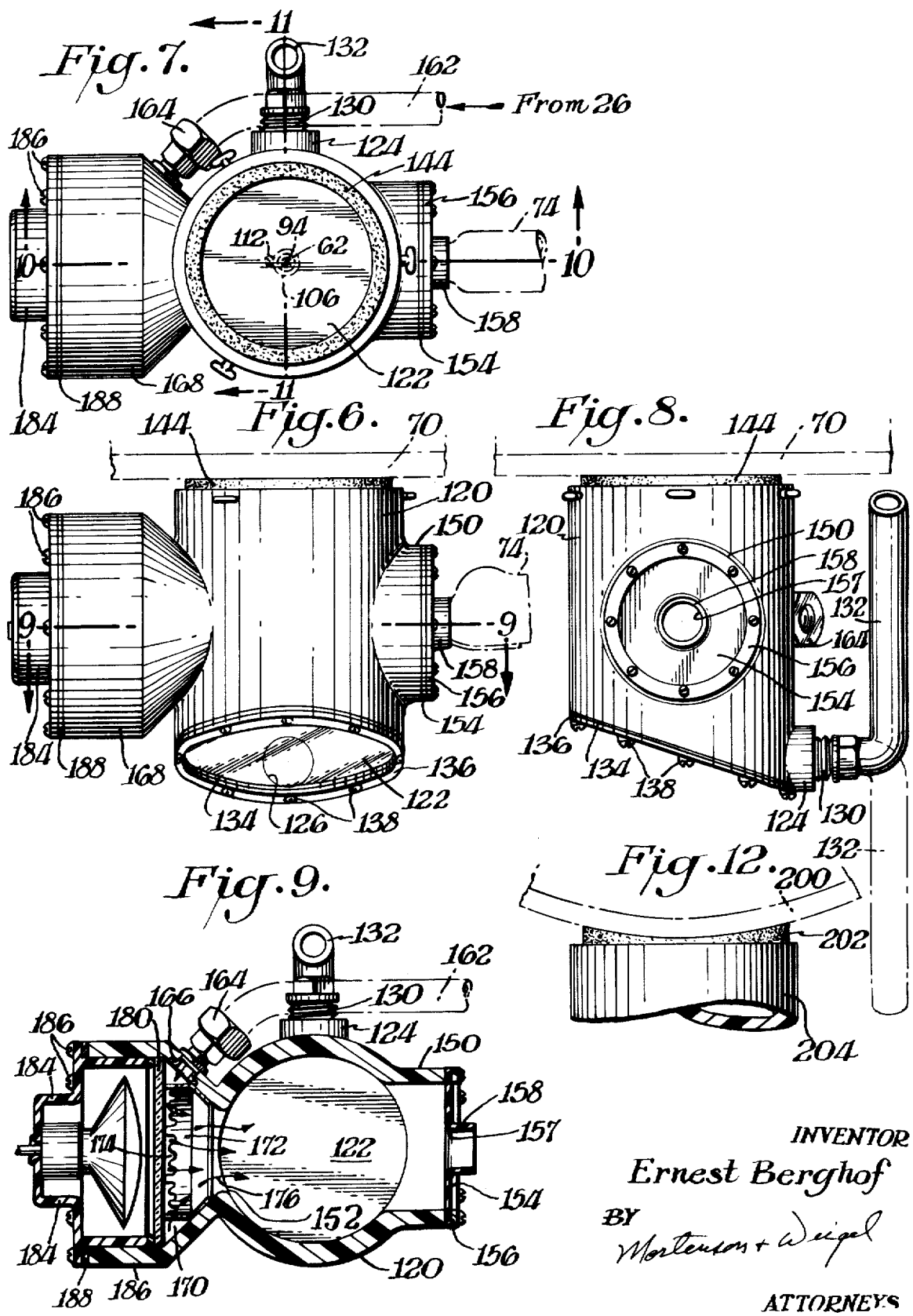

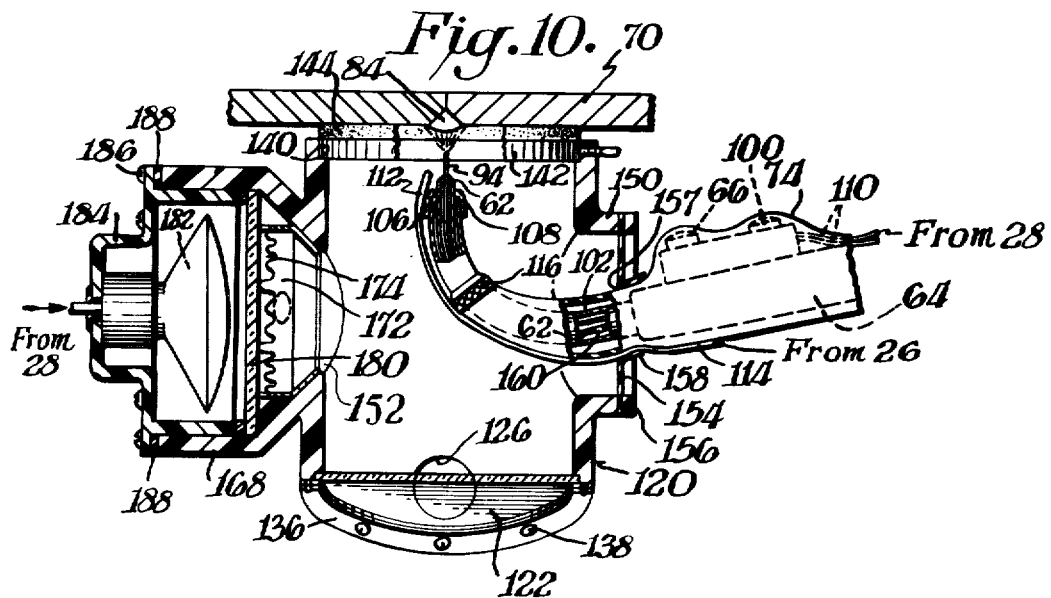
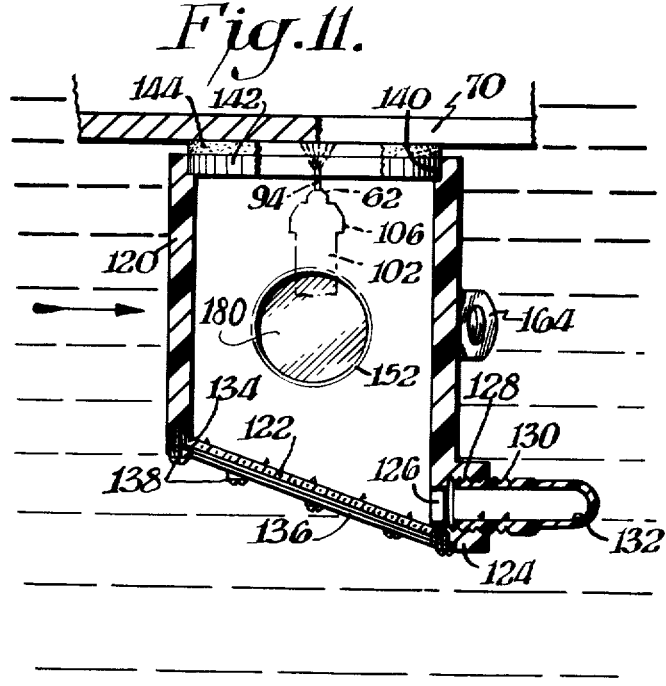

APPARATUS FOR UNDERWATER ARC WELDING

BACKGROUND OF THE INVENTION

This is a continuation of a patent application Ser. No. 175,220 filed Aug. 26, 1971, entitled "Method and Apparatus For Underwater Arc Welding" now abandoned, which is a division of patent application Ser. No. 886,245 filed Nov. 13, 1969, entitled "Method and Apparatus For Underwater Arc Welding" which issued as U.S. Pat. No. 3,632,950 on Jan. 4, 1972, which was canceled, and issued as U.S. Pat. No. 28,357 on Mar. 4, 1975, which in turn is a continuation-in-part of an application Ser. No. 701,700 filed Jan. 30, 1968 and now abandoned.

This invention relates to gas shielding and, more particularly, to gas shielded underwater electric arc welding using a consumable electrode.

At the present time underwater welds are achieved only with relatively great difficulty. In most cases, techniques employed encompass sinking a caisson over the affected area or pipe to be welded, pumping the water from within the caisson, and lowering the men and equipment into the caisson where the welding is performed. The men and equipment then are removed, water is allowed to enter the caisson and the caisson is finally removed. This procedure is not only time consuming but it is expensive.

Many efforts have been made to perform underwater welding using diving equipment. In the case of electric arc welding, coated, consumable electrodes have been developed which when consumed shield the welded area sufficiently to permit a weld of sorts. Welds, however, performed underwater using this technique, are generally unsatisfactory and not of the quality of welds obtainable above water.

It is, therefore, an object of this invention to provide for underwater welding using consumable electrodes.

Another object of this invention is to provide an improved apparatus for underwater welding using a positionable welding gun housing chamber.

A welding gun housing chamber is constructed to have first and second oppositely disposed openings, the first of which serves to mount an angularly positioned viewing plate, the second of which is open and adapted to contact the workpiece. A third opening in the housing chamber incorporates a flexible sealing jacket through which the welding gun itself may be inserted into the housing for welding the workpiece through the second opening. Shield gas is passed through a fourth opening in the housing. Light from a light source is directed through the fourth opening to illuminate the work area. The shielding gas itself is passed through a diffuser to prevent obstructing visibility within the chamber. An exhaust port may be formed in the chamber at a point immediately adjacent the viewing plate to permit water and other material to be exhausted readily from the housing itself. A vent tube may be rotatably mounted to the exhaust port.

In a preferred embodiment the chamber is hand portable and has a flexible gasket attached to the second opening to aid in keeping the weld area free of water.

Using this apparatus, welds having the quality of dry land welds may be formed using consumable electrodes and electric arc welding techniques.

BRIEF DESCRIPTION OF THE DRAWINGS

The invention, both as to its organization and method of operation, as well as additional objects and advantages thereof, will be further understood from the following description when read in connection with the accompanying drawings wich are not limitative and, in which:

FIG. 4 is a partial view enlarged of the welding gun and wire feeding unit partially cut away and partially shown by dotted lines to illustrate the details of the apparatus of this invention;

FIG. 5 is a top view of the wire feeding unit seen in FIG. 4;

FIG. 6 is a side elevation view of the underwater welding gun housing chamber constructed in accordance with the preferred embodiment of this invention;

FIG. 7 is a top plan view of the welding housing chamber illustrated in FIG. 6;

FIG. 8 is an end elevation view of the welding gun housing chamber illustrated in FIG. 6;

FIG. 9 is a cross-sectional view of the welding gun housing chamber taken through the section line 9—9 of FIG. 6;

FIG. 10 is a fragmented view of the welding gun housing chamber, with welding gun in operating position, taken along the section line 10—10 of FIG. 7;

FIG. 11 is a sectional view of the welding gun housing chamber taken along the section line 11—11 of FIG. 7; and FIG. 12 is a fragmentary view of a contacting gasket, used with the welding gun housing chamber, adapted to fit a cylindrical workpiece.

DETAILED DESCRIPTION OF THE PREFERRED EMBODIMENTS

According to the method of this invention, underwater electric arc welding may be accomplished using gas shielding techniques. An electric arc is drawn between an elongated consumable electrode and the workpiece, and this arc is protected from the surrounding water by forming an inner annular stream of shielding gas about the electrode and then flowing this inner stream along the axis of the arc coaxially about the arc. The shielding gas may be any of those conventionally used in gas shielded arc welding processes. Among these gases suitable for shielding are the inert gases helium, neon, argon, krypton, xenon and radon which are useful for welding of non-ferrous metals. Of these inert gases, helium and argon are the most used because of their relatively low cost. Argon is typically used with 1 to 5% oxygen.

To improve the penetration pattern of the weld, carbon dioxide also may be used for either ferrous or nonferrous welding. Carbon dioxide may also be used as the shielding gas either alone or in combination with any of the other gases. Indeed, carbon dioxide may be used as the outer shield only, the inner shield being eliminated. In many instances, the double shield is used in order to get the desired protection against chemical reaction by using the inert gases, but in instances in which chemical reaction at the weld is a minor problem or unlikely, one will use the inexpensive carbon dioxide extensively.

Whatever the shield gas employed, the outer annular gas stream is used for it is also used to protect the equipment. The outer stream is usually ejected from the welding gun nozzle. Each of the annular streams of shielding gas is generally directed from the end portion of the electrode assembly toward the workpiece and must have sufficient pressure above that of the surrounding water, to maintain the weld area and arc substantially free of water. In typical applications, welding is accomplished in water depths up to 150 feet and greater. Sufficiently high shielding gas pressures must be used to permit the flow of shielding gas into the water to protect the arc and weld area on the workpiece. In this manner, the many advantages of dry land or atmospheric electric arc welding using a shielding gas are obtained. It is also possible to lead the pressurized gas to the workpiece separately and apart from the welding gun or the wire feed. In such procedure the pressurized gas stream is generally directed across the arc and is not annular with the arc. The annular stream is preferred for convenience and ease of manipulation. Among these advantages of atmospheric arc welding are included arc stabilization, stronger welds, and others.

In alternative embodiments, the outer stream of shielding gas may be composed of air, if desired, for, generally the inner sheath is generally sufficient to shield the arc itself.

Figure 1:
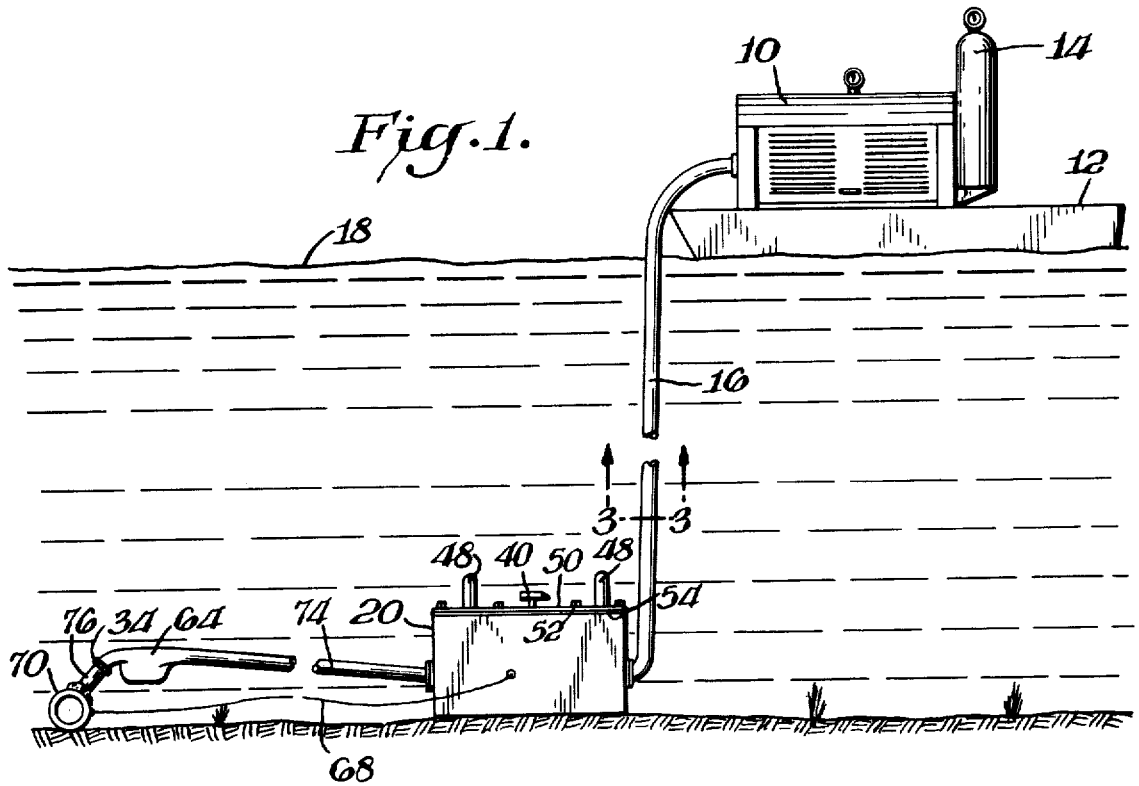
FIG. 1 is a sectional view denoting the overall disposition of the apparatus with reference to a body of water which apparatus is constructed in accordance with this invention and facilitates underwater electric arc welding.

The method of this invention is further described by reference to the apparatus illustrated in the drawings. In FIG. 1 for example there is illustrated a welding machine or power source and blower 10 which is resting on the floor of a boat or barge 12. The power source 10 may comprise a conventional source which provides a generator and suitable rectification and control equipment, if desired, to provide a direct current (D.C.) source of power and pressurized air. This source 10 should also have such control circuitry as is necessary to provide the necessary or desired output current characteristics.

Figure 3:
FIG. 3 is a cross-sectional view taken along the section lines 3—3 of the tubular conduit, illustrated in FIG. 1, which interconnects the wire feeding unit with the power supply and source of shielding gas.

Positioned on one end of the power supply is a source of shielding gas illustrated by the reinforced cylinder 14. Running from the power supply and blower 10 and shielding gas supply 14 is a tubular conduit 16 which passes downwardly through the water 18 to a conventional wire feeding unit with controls illustrated by the box 20. The conduit 16, as may be noted in the cross-sectional view of FIG. 3, comprises a tube, and enclosed within the tube 16 are a power cable 22, a ground wire 24, a shielding gas line 26 and a 110 volt A.C. supply 28 which supplies the necessary current for the wire feed drive motor in unit 20. The shielding gas supply 14 supplies both the gas line 26 and the tube 16 with shielding gas. Alternatively, the tube 16 may be supplied with air by the blower portion of the power source 10 or by another pressurized supply similar to the reinforced cylinder 14.

A conventional wire feeding unit and control is enclosed within the box 20. As is seen more clearly in FIG. 4, the conduit 16 is placed over a nipple 32 formed in the exterior of the box 20 and clamped as by a band clamp 34 of conventional type (FIG. 5). The interior of the box 20 includes the wire drive 60 which is shown as a box by way of illustration only. This wire drive, as is well known, automatically drives the consumable elongated electrode from a supply reel 38 at a controllable, constant rate. The wire feed rate control may be on a shaft 42 extending to the top face of the box 20 and controllable as by a knob 40. The shaft 42 to which the knob 40 is connected may pass through a suitable water-tight gasket 44 in the box 20. Handles 48 may be provided on the box to facilitate carrying. Box 20 may be formed of any suitable metal or other container capable of rough handling and may have an open upper side which is closed by a top plate 50 which may be bolted as by bolts 52 to the edges of the sides of the box 20. A sealing gasket 54 may insure a water-tight seal, if necessary.

The drive for the wire or consumable electrode 94 is illustrated as the box 60 positioned inside container 20. Connected to pass through box 60 are the several power and ground cables along the shielding gas conduit 26, these elements issuing from the conduit 16 which is connected to the inlet to box 20. Thus, the electrode wire issuing from box 60 is surrounded by the inner shielding gas as it passes to gun 64.

From the wire drive unit 60, the consumable electrode 94 passes through a guide tube 62 which contains the shielding gas from the shielding gas supply tube 26 and is connected directly to the welding gun 64 which is illustrated in dotted lines. The welding gun 64 includes a trigger switch 66 which closes a circuit in the control box 60 to actuate the wire feed. The arc is established when the electrode is in proper relationship to the workpiece 70. A ground line 68 is connected from the exterior of the control box 20 to the workpiece 70 illustrated as an underwater pipe 70. The guide tube 62, as well as the welding gun 64, are enclosed within a tubular conduit 74 which is similar to the conduit 16. The conduit 74 is also placed over a nipple 96 in one side of the box 20 and clamped as by a clamp 34 to maintain a water-tight connection. This permits outer shielding gas which flows through the interior of the input conduit 16 to pass into the interior of box 20, through the box 20 and through the outgoing conduit 74 to completely pressurize the entire system and, as will be described, to provide an outer shield of gas about the arc. The conduits 16 and 74 may be formed of any suitable rubber or rubberized or plastic fabric which is waterproof and impermeable and is reasonably flexible so as to permit the trigger 66 to be actuated by hand. In the alternative, the trigger switch 66 may be placed on the exterior of the conduit 74.

Figure 2:
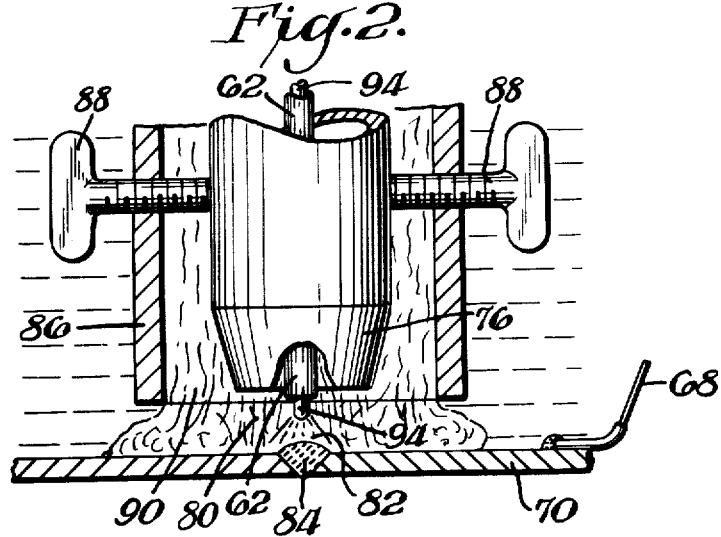
FIG. 2 is a cross-sectional view of the nozzle portion of a welding gun constructed in accordance with this invention.

The welding gun 64 includes a conventional nozzle 76 (dotted line) to which the conduit 74 is connected and is sealed as by a clamp 34. The details of the nozzle construction are seen in the enlarged view of FIG. 2, which shows the consumable electrode 94 passing through the guide tube 62 and entering the tapered tubular section of nozzle 76. The flow of shielding gas from the guide tube 62 forms an inner sheath 80 about the arc 82 formed between the consumable electrode 92 and the workpiece 70. This means that the actual weld 84 is surrounded by the shielding gas and chemical destruction of the metal is avoided.

If desired, to further insure the shielding of the weld 84 and arc 82, the nozzle 76 is surrounded by a coaxially disposed tube section 86. This tube section is retained by the clamp 34 in sealed coaxial relationship with the tube 74 (FIG. 4). It is coaxially positioned about the nozzle 76 as by means of thumbscrews. The section 86 may be formed of any suitable rigid material such as a plastic or steel. This permits the shielding gas flowing through the supply tube 16, which passes through the box 20 and the tube 74, to form an outer annular sheath 90 about the inner sheath of shielding gas 80. As such, it further protects the arc 82 and is permitted to bubble way peripherally from the welded area forcing water away from the working area.

The shield gas used for this outer sheath may be any of those previously described, but in addition may, for example, simply be air pumped in from the atmosphere as by the blower 10, if the expense of using shield gas for this purpose is considered too great. A chemically inactive gas is, however, preferred. The outer sheath shield gas may be a conventional shield gas and may be the same as or different than the inner sheath of shield gas.

Using the apparatus of this invention, a diver will submerge to the work area carrying along with him the wire feed and control box 20 and the welding gun. Someone on the surface will start the power supply and blower unit 10 and open the shield gas supply 14. The welder adjusts the wire feed speed, connects the ground wire and, when ready, squeezes upon the trigger switch 66. This establishes the electric arc between the consumable electrode and the workpiece. The arc thus formed is protected by the double sheath of shielding gas which is permitted to escape as it forces water away so that welding takes place within a pocket of shielding gas thus providing the many advantages of welding upon dry land.

The box 20, if desired, may include a pressure actuated switch which will de-energize the power unit 10 in the event of a loss of pressure. A loss of pressure usually would mean that a rip in one of the tubes or a failure of the shielding gas supply occurred. The pressure actuated switch provides a safety disconnection in the event that it is deemed desirable. Additional control features may be introduced if desired. For example, control of the welding current may also be adjustable from underwater by appropriate controls. The important features of this invention are that the underwater system is under a pressurized shield gas which protects all of the equipment as well as the electrical connections from the water. Other equivalents are possible. For example, box 20 may be entirely jacketed with a cover in conduit relationship with the outer shielding gas bearing tubes. Rather than passing this gas through box 20, it is passed around and over it. In any event, the arc itself is completely shielded by a double shield of protective gas such that arc welding under water may take place as if on dry land.

In a preferred embodiment of this invention a housing chamber adapted to provide a pocket of shield gas about the weld area and to house the tip of the welding gun itself is constructed to be generally of a hollow cylindrical shape with either end of the housing chamber 120 defining an opening having a particular function. This housing chamber 120 is shown in the various representations depicted in FIGS. 6–11, inclusive. The lower end of the housing chamber (in the drawing), as is perhaps seen most clearly in FIGS. 6 and 10, has a transparent viewing plate 122. The viewing plate 122 is disposed in the lower portion of the housing chamber 120 at an angle with respect to the axis of the cylindrical housing chamber 120 to permit any water, welding particles, etc. to fall to the bottom, i.e., the lowermost extremity of the housing chamber away from the central portion of the viewing plate. At this extremity, a box 124 is formed and a bore or vent tube orifice 126 is provided therein. The orifice 126 is threaded at the interior portion as at 128 to accommodate a male threaded end 130 of a vent tube 132. The vent tube is typically L-shaped and has an open end and typically may be in the order of one-quarter to one-half inch in internal diameter to permit the escape of air pressure, water, welding particles, etc. as will be described hereinafter.

The viewing plate 122 is seated against a shoulder 134 formed in the interior walls of the housing chamber 120 and is retained in place by a retaining gasket 136 which may be secured to the walls of the housing chamber as by a plurality of screws 138.

The upper end of the housing chamber 120, as is seen in the drawings, particularly FIGS. 10 and 11, is seen to have an internal shoulder portion 140 adapted to accommodate a gasket sleeve which sleeve 142 may be removably inserted and fitted in the housing chamber 120 to be supported by the shoulder 140. A flexible gasket 144 is attached to the end face portion of the sleeve 142 to permit its contact with the welding workpiece 70 thereby to surround the immediate weld area 84. This gasket 144 may be formed of any suitable, flexible material, preferably, a porous rubber such as foam rubber or plastic. With a porous material, when the housing chamber 120 is pressurized, the shield gas may bubble through the gasket material and thereby prevent water from entering. Such bubbling action also facilitates and serves to lubricate the movement of the gasket material across the workpiece as the welding is accomplished. However, any flexible material capable of providing a good sealing contact with the workpiece 70 may be used.

Radial openings 150 and 152 are also formed (typically in opposite walls) of the cylinder housing chamber 120. The orifice or opening 150 formed in the righthand wall (as seen in FIG. 10) is adapted to permit the entry of the welding gun itself. To facilitate this, a flexible sealing jacket 154 is placed over the opening and held in position by a retaining member 156 which may be secured as by screws or other suitable means to the walls of the housing chamber 120. For this purpose, it is preferred that the opening 150 be in the form of a short length cylindrical member which may be molded contiguous with the housing chamber 120 and radially disposed to the housing chamber 120, as perhaps seen most clearly in FIGS. 6 and 7. The particular configuration, however, is purely a function of design. The prime requisite be that it exceed in diameter the diameter of the welding gun tip portion that is to be inserted into the housing chamber 120 and that the jacket 154 be flexible (rubber or suitable pliable plastic material may be used) and that it have a central opening therein of sufficient diameter to accommodate the gun itself and yet tightly engage the gun in a sealing relationship. To improve this seal the opening 157 in the jacket 154 may have an annular shoulder portion 158.

The welding gun itself may be of a conventional variety, such as that described hereinbefore, modified slightly as will be described. Thus, the gun 64 includes therein the conventional guide tube 62 which holds the consumable electrode 94 and through which shield gas from the pressurized box 20 (FIG. 4) is passed. The gun 64 is modified slightly over that described hereinbefore inasmuch as it has two switches, one switch 66 for controlling the welding current and a second switch 100 for controlling a solenoid actuated valve which in turn controls gas flow through a clearing jet 112. The clearing jet 112, as will be described hereinafter, is positioned adjacent the gun tip and is directed to permit a short blase of shield gas to clear debris and water from the weld area. The entire gun 64 is enclosed in a sleeve or conduit 74, as described hereinbefore, which houses the various shield gas lines as well as wires or cable which carry the welding current, lighting current and switch current. These wires and conduits may be in a composite cable as is the case in ordinary welding usage or may be run individually since they are all within the outer retaining sleeve 74.

The tip of the gun 64 has an annular support member 102 which annularly encloses the guide tube 62 and consumable electrode 94. The other modification of the gun necessary is that the exterior of the support member 102 be threaded to accommodate a cap nut 106 which holds an O-ring 108 against the end portion of the support 102 to provide a seal of the annular space between the guide member 62 and the annular support member 102 which normally contains an annular insulator. The cap nut 106 has an axial opening therein which is larger than the guide member 62 to further secure, insulate, and seal it from the guide member although insulating sleeves (not shown) suitably insulate and position the guide member 62 within the annular support 102. Finally, a sealing ring 116 terminates and seals the sleeve or conduit 74 to prevent the shielding gas pressure from escaping from the shielded gun 64.

Lastly, a small radial orifice 160 may be formed in the guide tube 62 to insure that sufficient shielding gas may pass through and around the consumable electrode 94 and out the tip or end portion of the guide tube 62. The shield gas lines for the clearing jet 112 as well as those supplying gas to insulate the gun assembly itself all may be derived from the gas supply tube 26 (FIG. 4). In like manner, the power for the switches 66 and 100 may be derived from the electrical line 28 (FIG. 4) to control the necessary solenoid actuated switches for controlling the welding current and the various gas supplies as required.

Shielding gas is supplied to the interior of the housing chamber 120 through a suitable tubing (shown in phantom) 162 which in turn may be connected back to the shield gas supply tube 26 (FIG. 4) or, for that matter, directly back to the gas supply above the surface, as desired. The shield gas supply tube 162 is terminated in a conventional fitting 164 which is connected to an orifice 166 formed in what is illustrated as a hollow cylindrical light housing cavity 168 attached or formed contiguous with the housing chamber 120 at the orifice 152. Shield gas from the tube 162 is allowed to pass into an annular passageway 170 formed by the housing 168 and a ring-like, radial diffuser 172. This radial diffuser has peripherally disposed openings 174 therein so that the gas may diffuse slowly into the housing chamber from all points of the circumference of the diffuser and provide a smooth flowing path as denoted by the arrows 176 (FIG. 9). This prevents disturbing any water or other particles within the housing chamber and causing them to swirl and blur the welder's vision.

To aid in positioning the diffuser 172, a transparent light window 180 is positioned within the light housing 168. To complete this assembly, a light 182 (illustrated only symbolically) is attached to the rear portion of the light housing so as to direct its light through the window 180 and the opening 152 into the interior of the housing chamber 120. Although illustrated as being positioned perpendicularly to the axis of the housing, it is to be noted that this light may be directed directly toward the workpiece or away therefrom as may be desired and convenient in the design of the chamber. The light, itself, is held in position by a lamp holder 184 and is attached to the light housing 168 as by screws 186 or other suitable means. A sealing gasket 188 may be used to insure a water-tight seal as may be desired. Power for the light may be derived from the electrical power source leads 28 (FIG. 4). Suitable switch means for the light may be provided as necessary.

To use the unique underwater welding gun housing illustrated in FIGS. 6 through 11, inclusive, the welding gun 64 is inserted through the opening 157 in the jacket 154. The light 182 is turned on and the housing chamber 120 positioned over the joint in the workpiece 70 to be welded. Next the shield gas supplies are turned on (usually the shield gas supply through the gun itself is maintained "on" to insure against the entry of water) to evacuate the water, etc. from the housing chamber 120. Such evacuation is readily accomplished through the vent tube 132. Next the switch 100 is depressed which actuates the solenoid to pass a burst of clearing shield gas through the jet 112 directly into the weld area. This removes any residual water that might be present as well as any other dirt, particles, etc. Finally, the welding gun is positioned and as the work area is viewed through the viewing plate by the diver, the welding switch depressed, the weld is accomplished and the diver again surfaces to go to another job.

During the welding operation, as the weld is being accomplished along the bottom surface of an object, the vent tube 132 which is rotatable, is maintained in an upright position. During the time that a weld is being accomplished on a vertical surface, the vent tube 132 is maintained in a position slightly downward from the horizontal position. Similarly, when the weld is being accomplished upon a top surface, the vent tube is maintained in a downward positon with respect to the surface. The adjustment of this vent tube does control to a degree the amount of shield gas that is discharged through the vent tube and may be adjusted as necessary by the welder.

It may be noted as seen most clearly in FIG. 11, that when welding a bottom surface, residual water as well as welding particles tend to fall onto the viewing plate. These, because of the sloping surface of the viewing plate, fall to the bottom most extremity of the housing where they are passed due to the flowing shield gas out through the vent tube 132. For this purpose the viewing plate may be positioned or constructed at any angle between 0° and 90° relative to the axis of the housing chamber 120. However, angles varying between 25° and 60° with respect to the axis are preferred. Extremely acute angles tend to obstruct the vision due to refraction and increase the required length of the housing chamber. Conversely, angles approaching 90° do not permit the welding particles to fall off the viewing plate. The welding particles would tend to accumulate and block the vision of the welder. Appropriate sloping of the plate prevents such accumulation.

A small problem is encountered when welding underwater surfaces from the top. Specifically, the escaping shield gas bubbles tend to obstruct the welder's view. This may be prevented by the simple expedient of placing a funnel over the viewing plate such that these bubbles are deflected outwardly and away from the face of the welder.

The flexible gasket 144 and its mounting sleeve 142 which is insertable by a friction fit into the end of the housing chamber 120, may have different configurations to accommodate different surfaces. Thus to accommodate a cylindrical workpiece such as a pipe 200 illustrated in FIG. 12, the flexible gasket 202 (and the sleeve 204, if necessary) may have a curvature in their plane to conform to the exterior of the pipe 200. Other configurations might include interior and exterior corners, etc.

The invention described, using shield gases, as well as the housing, which is a preferred apparatus of the invention, permits high quality electrical welds to be accomplished under water using either AC or DC welding current and consumable electrodes with the same quality and with almost the same facility as may be accomplished in dry land welding.

While the invention has been disclosed herein in connection with certain embodiments and certain structural and procedural details, it is clear that changes, modifications or equivalents can be used by those skilled in the art; accordingly, such changes within the principles of the invention are intended to be included within the scope of the claims below.

What is claimed is:

1. Apparatus for use under a body of water for arc welding comprising:
    a housing defining a chamber and having a welding opening and a welding gun opening,
    means for movably introducing at least a portion of a welding gun through said welding gun opening into the chamber in a position to carry out a welding operation on a workpiece located outside of said chamber contiguous said welding opening,
    means for introducing a gas under pressure into said chamber thereby to purge the chamber of water, and
    outlet means in said housing to facilitate purging said chamber of water, said outlet means being rotatable to said housing, said outlet means being so configured and oriented relative to said housing that the adjustment of said outlet means by rotation affords a control of the amount gas discharged through it and thereby the gas pressure in said chamber.

2. An apparatus according to claim 1 wherein said welding gun introducing means is a flexible sealing means on the housing for making sealing engagement with said welding gun when said portion of said gun is located within the chamber in a position to carry out a welding operaion on a workpiece located contiguous said welding opening.

3. An apparatus according to claim 1 which also includes contact means secured to said welding opening to provide an interface between said chamber and said workpiece.

4. An apparatus according to claim 1 wherein said housing is capable of being handheld.

5. An apparatus according to claim 1 which housing also includes means for viewing the workpiece through said chamber and said welding opening.

6. An apparatus according to claim 5 wherein said outlet means defines an exhaust port communicating with the interior of said chamber at a point contiguous said viewing means thereby to aid in clearing said viewing means of water droplets and debris.

7. Apparatus according to claim 5 wherein said viewing means is a viewing plate aparallel to the plane of said welding opening.

8. An apparatus according to claim 1 wherein said means for purging said chamber includes:
    means defining an additional opening in said chamber to receive additional elements, and
    means for diffusing said gas through said additional opening into said chamber.

9. An apparatus according to claim 8 wherein said additional elements positioned in said additional opening comprise a seal, a transparent member and light means for illuminating the interior of said chamber and said workpiece through said additional opening and said transparent member.

10. An apparatus according to claim 9 wherein said diffusing means includes means for passing said gas over a radially positioned element affording a uniform smooth flow of gas through said additional opening into said chamber housing.

11. Apparatus for use under a body of water for arc welding, comprising:
    a housing defining a chamber and having a welding opening,
    means for movably introducing at least a portion of a welding gun into the chamber in a position to carry out a welding operation on a workpiece located outside of said chamber contiguous said welding opening,
    a gas inlet for connection to a source of gas under pressure to permit a stream of gas to be introduced into the chamber to purge the chamber of water,
    said housing being portable and capable of being handheld to facilitate unrestricted movement of the housing chamber over the workpiece during welding, and
    outlet means for said water being purged and which means is rotatable relative to said housing, said outlet means being so configured and arranged relative to the housing that the adjustment of said outlet means by rotation affords a control of the amount gas discharged through it and thereby the gas pressure in said chamber.

12. An apparatus according to claim 11 wherein said introducing means is a flexible seal means for making sealing engagement with a welding gun when the gun is located within the chamber in a position to carry out a welding operation on a workpiece located contiguous said welding opening.

13. Apparatus for use under a body of water for arc welding a workpiece comprising:
    a housing chamber having means defining viewing and welding openings, there being a consummable welding electrode extending into said housing chamber through a wall thereof and positioned in said welding opening to be substantially perpendicular to the plane of the area to be welded, whereby said viewing opening and said electrode are in visual alignment through said chamber, the line of said alignment being generally perpendicular to the plane of the area to be welded on said workpiece, thereby to provide an unimpeded view of the area of the workpiece to be welded,
    a transparent viewing member at said viewing opening, means for movably introducing said consumable electrode through said wall into the chamber so to be in a position to carry out a welding operation on said workpiece positioned outside said chamber contiguous said welding opening, means for purging said chamber of water using a gas under pressure, and contact means secured to said welding opening to provide an interface between said chamber and said workpiece, said contact means being a porous gasket thereby to permit the escape of said gas therethrough to facilitate relative movement between said chamber and said workpiece.

14. Apparatus according to claim 13 wherein said housing chamber is a hollow cylindrical tube open at both ends, one of said ends defining said welding opening, the second of said ends defining said viewing opening, said electrode extending into said chamber through an opening located laterally of the line of alignment between said welding and viewing openings.

15. Apparatus according to claim 13, which also includes: a welding unit having said consumable electrode, and means for establishing an electric arc between said electrode and said workpiece.

16. Apparatus according to claim 13 wherein said viewing member intersects said line of alignment at an angle lying between 0° and 90°.

17. Apparatus according to claim 16 wherein said viewing member and the wall of said chamber acutely intersect and which also includes a vent tube communicating with the interior of said chamber at a point contiguous the actue intersection of said viewing member and said chamber wall, thereby to facilitate removing water and extraneous matter from said chamber and maintaining a substantially unimpeded view through said viewing member.

18. Apparatus according to claim 7 wherein said vent tube is adjustably mounted to facilitate its adjustment to different positions relative to said chamber, thereby to control the gas pressure in said chamber at a value exceeding that of the surrounding water.

19. Apparatus according to claim 18 wherein said means for purging said chamber includes:

means defining an additional opening in said chamber, and means for diffusing said gas through said additional opening into said chamber, thereby to prevent turbulence in said chamber.

20. Apparatus according to claim 19 which also includes light means for illuminating said workpiece through said additional opening.

21. An apparatus according to claim 13 wherein said purging means includes means for introducing a gas into said chamber at a pressure exceeding that of the surrounding water.

22. An apparatus according to claim 13 wherein said contact means is removably secured to said welding opening.

23. An apparatus according to claim 13 which also includes a vent tube adjustably mounted to facilitate its adjustment to different positions relative to said chamber, thereby to control the gas pressure in said chamber at a value exceeding that of the surrounding water.

24. An apparatus according to claim 19 which also inclues means defining an exhaust port communicating with the interior of said chamber at a point contiguous said viewing member thereby to remove foreign matter from said viewing plate.

25. Apparatus according to claim 13 wherein said contact means is shaped to generally conform to the configuration of the portion of said workpiece in contact with said chamber.

26. An apparatus according to claim 13 wherein said contact means is flexible thereby to facilitate relative movement between said chamber and said workpiece.

27. In an underwater welding device, an elongated viewing tube, a nozzle at one end of said viewing tube, said nozzle having an open base end, a viewing window at the second end of said viewing tube, welding equipment positioned within said nozzle with an electrode exposed through the open base end and arranged generally perpendicular to the plane of said open base end, and means comprising a gas under pressure for purging the interior of the viewing tube and nozzle of water, said viewing tube and nozzle defining a straight viewing passage from the viewing window to the electrode accommodating base end also in an alignment generally perpendicular to the plane of said open base end of said nozzle, an angularly directed branch passage forming portion on said nozzle, said branch passage forming portion accommodating and enabling a mounting of said welding equipment laterally of the defined straight view passage; the means for purging the interior of the viewing tube and nozzle of water comprising a gas tube communicated with the viewing tube adjacent the second end thereof, said gas tube extending therefrom to a gas supply.

28. The device of claim 27 wherein the water is purged utilizing an inert gas introduced both through the gas tube and the equipment accommodating branch passage forming portion.

29. The device of claim 28 including a light mounted within the device for illuminating the weld site at the base end of the nozzle.

30. The device of claim 28 incuding conductor wires for said light, said conductor wire extending through said gas tube for a communicating with the light interiorly within said device.

31. The device of claim 27 including a light mounted within said device for illuminating the weld site at the base end of the nozzle, and conductor wires connected to said light for the supplying of power thereto, said conductor wires extending through said gas tube.

32. In an underwater welding device, an elongated viewing tube, a nozzle at one end of said viewing tube, said nozzle having an open base end, a viewing window at the second end of said viewing tube, welding equipment positioned within said nozzle with an electrode exposed through the open base end and arranged generally perpendicular to the plane of said open base end, and means comprising a gas under pressure for purging the interior of the viewing tube and nozzle of water, said viewing tube and nozzle defining a straight viewing passage from the viewing window to the electrode accommodating base end also in an alignment generally perpendicular to the plane of said open base end of said nozzle, the means for purging the interior of the viewing tube and nozzle of water comprising a gas tube communicated with the viewing tube adjacent the second end thereof, said gas tube extending therefrom to a gas supply.

33. The device of claim 32 including a light mounted within said device for illuminating the weld site at the base end of the nozzle, and conductor wires connected to said light for the supplying of power thereto, said conductor wires extending through said gas tube.

* * * * *